(12) United States Patent
Chai

(10) Patent No.: US 9,193,389 B2
(45) Date of Patent: Nov. 24, 2015

(54) SIDE BOTTOM STRUCTURE OF VEHICLE BODY FOR IMPROVING CRASHWORTHINESS AND ANTI-CORROSION PERFORMANCE

(71) Applicants: Hyundai Motor Company, Seoul (KR); Kia Motors Corporation, Seoul (KR)

(72) Inventor: Suk Jun Chai, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/327,112

(22) Filed: Jul. 9, 2014

(65) Prior Publication Data
US 2015/0175213 A1    Jun. 25, 2015

(30) Foreign Application Priority Data

Dec. 20, 2013   (KR) .......................... 10-2013-0160722

(51) Int. Cl.
*B60J 7/00*      (2006.01)
*B62D 25/08*     (2006.01)

(52) U.S. Cl.
CPC ..................................... *B62D 25/08* (2013.01)

(58) Field of Classification Search
CPC .......... B61D 7/00; H04N 9/077; A01B 13/08; A01B 63/166; A01C 17/00; E05B 13/005; E05B 15/102; E05B 17/0025; E05B 17/0041
USPC ................... 296/187.09, 187.12, 203.03, 209
See application file for complete search history.

(56) References Cited

U.S. PATENT DOCUMENTS

| | | | | |
|---|---|---|---|---|
| 5,011,201 A * | 4/1991 | Takahashi et al. | ....... | 296/203.02 |
| 5,246,264 A * | 9/1993 | Yoshii | ...... | 296/203.03 |
| 5,354,115 A * | 10/1994 | Esaki | ...... | 296/203.03 |
| 8,641,131 B2 * | 2/2014 | Honda et al. | ....... | 296/187.12 |
| 2002/0043821 A1 * | 4/2002 | Takashina et al. | ....... | 296/203.03 |
| 2003/0184126 A1 * | 10/2003 | Yamazaki et al. | ........... | 296/209 |
| 2010/0123337 A1 * | 5/2010 | Tamura et al. | ........... | 296/203.03 |
| 2010/0295336 A1 * | 11/2010 | Itakura | ...... | 296/193.06 |
| 2011/0049937 A1 * | 3/2011 | Fujii et al. | ...... | 296/204 |
| 2011/0260503 A1 * | 10/2011 | Fujii et al. | ...... | 296/205 |
| 2012/0119546 A1 * | 5/2012 | Honda et al. | ....... | 296/203.01 |
| 2012/0248825 A1 * | 10/2012 | Tamura | ...... | 296/209 |

(Continued)

FOREIGN PATENT DOCUMENTS

| | | |
|---|---|---|
| JP | 3147965 B2 | 3/2001 |
| JP | 2011-207455 A | 10/2011 |

(Continued)

*Primary Examiner* — Kiran B Patel
(74) *Attorney, Agent, or Firm* — Morgan, Lewis & Bockius LLP

(57) ABSTRACT

A side bottom structure of a vehicle may include a side sill having a closed cross-section with a predetermined outline, forming a side bottom of the vehicle body, and elongated in a longitudinal direction of the vehicle, a front pillar having one end thereof connected to a front end of the side sill and elongated in a height direction of the vehicle toward a roof of the vehicle, and a side outer panel combined with the side sill and the front pillar and forming a side external appearance of the vehicle body, wherein the side sill is formed by combining an inner side sill and an outer side sill, and wherein the inner and outer side sills have constant transverse cross-sections respectively, and a front end of the inner side sill and a front end of the outer side sill protrude further than the front of the front pillar.

11 Claims, 5 Drawing Sheets

(56) References Cited

U.S. PATENT DOCUMENTS

| | | | |
|---|---|---|---|
| 2012/0274099 A1* | 11/2012 | Tamura | 296/193.06 |
| 2012/0306239 A1* | 12/2012 | Tamura et al. | 296/209 |
| 2013/0020836 A1* | 1/2013 | Shida et al. | 296/203.03 |
| 2013/0049391 A1* | 2/2013 | Kurogi et al. | 296/30 |
| 2013/0049392 A1* | 2/2013 | Kurogi et al. | 296/30 |
| 2013/0049408 A1* | 2/2013 | Kurogi et al. | 296/209 |
| 2013/0140854 A1* | 6/2013 | Mori | 296/209 |
| 2013/0200650 A1* | 8/2013 | Matsuoka et al. | 296/187.1 |
| 2013/0264840 A1* | 10/2013 | Izumi et al. | 296/187.12 |
| 2014/0035325 A1* | 2/2014 | Naito et al. | 296/203.02 |
| 2014/0084634 A1* | 3/2014 | Suzuki et al. | 296/205 |
| 2014/0327271 A1* | 11/2014 | Kishima et al. | 296/193.07 |
| 2014/0333093 A1* | 11/2014 | Matsuura et al. | 296/187.12 |

FOREIGN PATENT DOCUMENTS

| | | |
|---|---|---|
| JP | 2012-111247 A | 6/2012 |
| KR | 100199951 B1 | 3/1999 |
| WO | WO 2011/077808 A1 | 6/2011 |

* cited by examiner

Vehicle body skin replacing side seal molding

Electrodeposition hole

<Configuration of electrodeposition hole of present invention>

<Open shape of front of present invention>

SIDE BOTTOM STRUCTURE OF VEHICLE BODY FOR IMPROVING CRASHWORTHINESS AND ANTI-CORROSION PERFORMANCE

CROSS-REFERENCE TO RELATED APPLICATION

The present application claims priority of Korean Patent Application Number 10-2013-0160722 filed on Dec. 20, 2013, the entire contents of which application are incorporated herein for all purposes by this reference.

BACKGROUND OF INVENTION

1. Field of Invention

The present invention relates to a side bottom structure of a vehicle body, and more particularly, to an improved structure of a side sill, a front pillar, and a side outer panel and a method of combining them.

2. Description of Related Art

In general, the side bottom structure of vehicles is composed of a side sill, the lower portion of a front pillar, and a side outer panel, forms the external appearance of the side and functions as a support against load. In particular, shock load is divided and supported to the upper portion of the front pillar and the side sill in a front collision of a vehicle, such that appropriate shock performance is maintained.

In general, electrodeposition liquid is applied to the steel plate for vehicle bodies to give anti-corrosion performance in the process of assembling the vehicle bodies. The anti-corrosion performance means the ability of preventing corrosion of the steel plate. An effect of reducing vibration and noise transmitted along the surface of vehicle bodies can be achieved, only when electrodeposition liquid is appropriately applied to the inner and outer sides of the steel plate for the vehicle bodies.

In a side bottom structure of a vehicle body (see FIGS. 1A and 1B), a side sill 1, 2, which is a channel of the side bottom of a vehicle body and is formed by combining an inner side sill 1 and an outer side sill 2, is an important frame of the vehicle body, extending in the longitudinal direction of the vehicle body.

The side outer panel 7, a part combined with the outer side sill 2, forms the external appearance of a side of a vehicle body together with a door outer panel. A vehicle body skin portion replacing a side sill molding (not shown) is formed on the side outer panel 7. The side sill molding is a plastic decoration part that is attached to improve the external appearance of the outer side sill 2 and protect the vehicle body.

In vehicles without a side sill molding, it is required to form a skin part replacing a side sill molding, as shown in FIGS. 1A and 1B, in order to function as a side sill molding.

Referring to FIGS. 1A and 1B, a side bottom structure of a vehicle body of the related art has a drawback that electrodeposition liquid cannot flow smoothly due to an electrodeposition hole 9 at the upper portion of the side sill 1, 2. Even if electrodeposition liquid flows in the electrodeposition hole 9, it has to pass through a hole of the outer side sill 3 to be able to flow into the side outer panel 7. In particular, the hatched portion is vulnerable to corrosion and has a chronic problem.

Further, in the side bottom structure of a vehicle body of the related art, the side sill 1, 2 cannot protrude from the front of the front pillar because of formability of the side outer panel 7 and the external appearance of the joint with the front pillar, so the parts are divided and the collision performance is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a side bottom structure of a vehicle body having advantages of being able to increase productivity by reducing the number of parts and improve formability of a side outer panel in order to solve the problem with deterioration of collision performance and the chronic problem in anti-corrosion in side bottom structures of the related art.

In an exemplary embodiment of the present invention, a side bottom structure of a vehicle, may include a side sill having a closed cross-section with a predetermined outline, forming a side bottom of the vehicle body, and elongated in a longitudinal direction of the vehicle, a front pillar having one end thereof connected to a front end of the side sill and elongated in a height direction of the vehicle toward a roof of the vehicle, and a side outer panel combined with the side sill and the front pillar and forming a side external appearance of the vehicle body, wherein the side sill is formed by combining an inner side sill and an outer side sill, and wherein the inner side sill and the outer side sill may have constant transverse cross-sections respectively, and a front end of the inner side sill and a front end of the outer side sill protrude further than the front of the front pillar.

The side bottom structure may further include a bulk head for closing the front end of the side sill, wherein the bulk head may have a same cross-section as the predetermined outline and is fitted on an inner side or an outer side of the front end of the side sill, and wherein one or more electrodeposition holes are formed in the bulk head.

The front pillar may further include a front pillar reinforcing member.

The front pillar reinforcing member is combined to be matched with the front pillar, the side outer panel, and the outer side sill.

The front pillar reinforcing member is formed first when the side outer panel is formed, and is combined with the front pillar integrally with the side outer panel.

The front pillar reinforcing member is formed first when the side outer panel is formed, and is combined with the front pillar monolithically with the side outer panel.

A front opening of the side outer panel is shaped to be matched with a cross-section of the outer side sill.

An opening that is matched and fitted on an outer side of the front pillar reinforcing member is additionally formed above the front opening of the side outer panel.

A side bottom structure of a vehicle body is not equipped with a side sill molding.

According to the present invention, it is possible to improve both of collision performance and anti-corrosion performance of a side sill and a side outer panel of a side bottom structure, increase productivity by reducing the number of parts, and reduce the manufacturing cost by improving formability of the side outer panel.

The methods and apparatuses of the present invention have other features and advantages which will be apparent from or are set forth in more detail in the accompanying drawings,

Figure 1A:
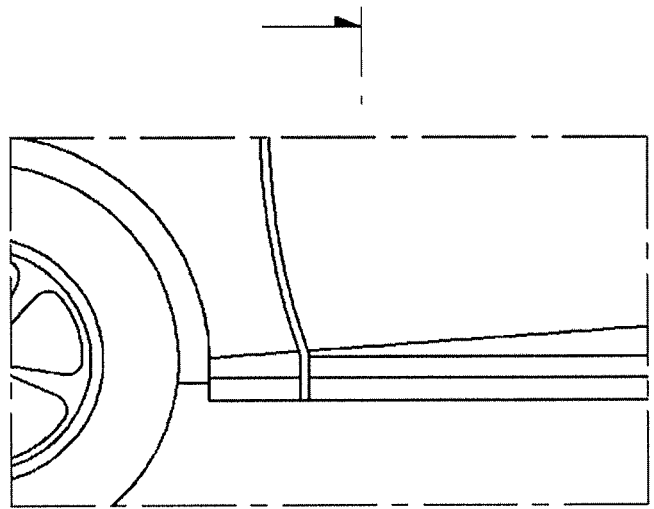
FIGS. 1A and 1B are a transverse cross-sectional view of a side bottom structure of a vehicle body.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTIONS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will be described in detail with reference to the accompanying drawings so that those skilled in the art can easily achieve the present invention.

The exemplary embodiment is an example of the present invention and can be modified in various ways by those skilled in the art, so the scope of the present invention is not limited to the exemplary embodiment of the present invention to be described below.

Through the present specification, unless explicitly described otherwise, "including" any components will be understood to imply the inclusion of other components rather than the exclusion of any other components.

Figure 2:
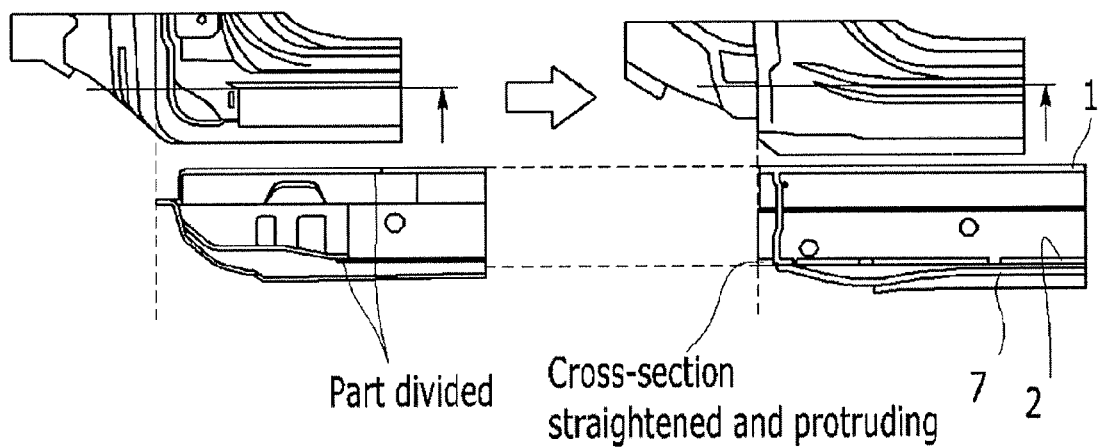
FIG. 2 is a cross-sectional view showing the upper portions of side bottom structures of a vehicle body of the related art and an exemplary embodiment of the present invention.

FIG. 2 is a cross-sectional view showing the upper portions of side bottom structures of a vehicle body of the related art and the present invention.

Referring to FIG. 2, in the related art, the front of a side outer panel 7 is formed to be round in order to improve the external appearance without the cross-section of side sill 1, 2 protruding. Accordingly, the side sill 1, 2 needs to be divided into two parts. This is because the front of the side sill 1, 2 should be rounded to fit the side outer panel 7 for the appearance.

In contrast, according to an exemplary embodiment of the present invention, the cross-section of the side sill 1, 2 may protrude forward from the front of a front pillar 5. That is, the inner side sill 1 and the outer side sill 2 may be integrally or monolithically formed respectively with predetermined cross-sections longitudinally maintained. Accordingly, the side sill 1, 2 have a predetermined closed cross-section, not divided into parts. The side outer panel 7 may be formed with the front open, which is advantageous in formability, as compared with round shape with the front closed.

Figure 3A:
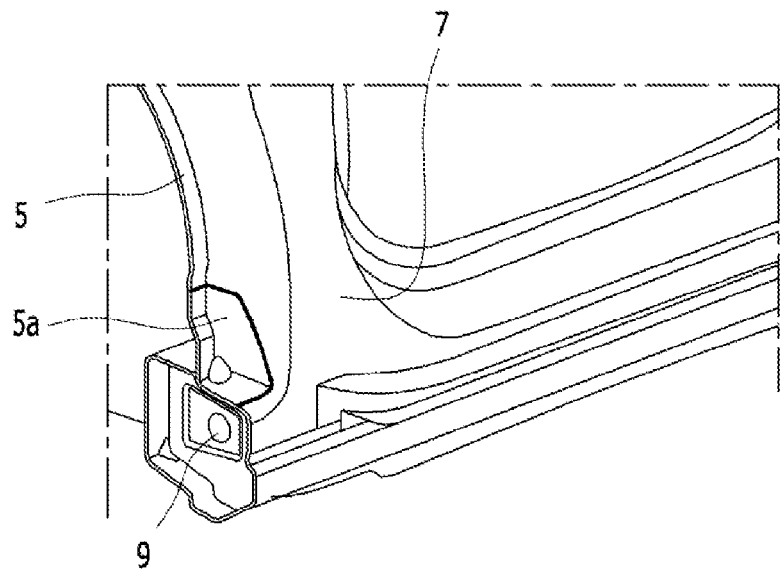
FIGS. 3A and 3B are an assembly perspective view and an exploded perspective view of a side bottom structure of a vehicle according to an exemplary embodiment of the present invention.
Figure 3B:
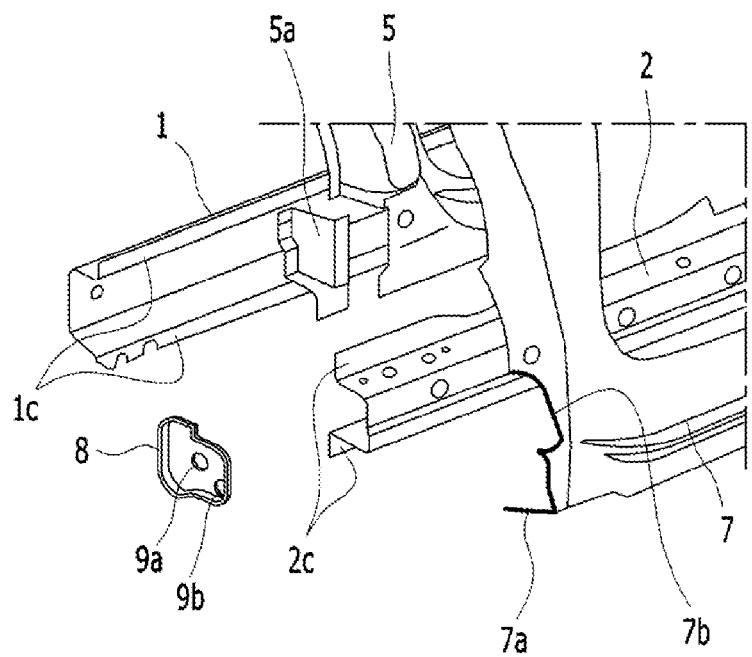

FIGS. 3A and 3B are an assembly perspective view and an exploded perspective view of a side bottom structure of a vehicle according to an exemplary embodiment of the present invention.

FIG. 3A is an assembly perspective view of the side bottom structure of a vehicle according to an exemplary embodiment of the present invention.

The front end of the side sill 1, 2 protrudes forward in the longitudinal direction of the vehicle body, further than the front of the front pillar 5.

FIG. 3B is an exploded perspective view of the side bottom structure of a vehicle according to an exemplary embodiment of the present invention.

Referring to FIG. 3B, the inner side sill 1 and the outer side sill 2 forming the side sill 1, 2 are integrally formed respectively with constant transverse cross-sections. Since parts are not divided, possibility of bending in collision is low and collision performance is improved accordingly.

The inner side sill 1 and the outer side sill 2 may be formed closest to a tire in consideration of the gap from the tire respectively with the cross-sections constant to the front of the side sill 1, 2. The inner side sill 1 and the outer side sill 2 may be combined by top and bottom flanges 1c and 2c. They may be combined by spot welding.

The side bottom structure of a vehicle body according to an exemplary embodiment of the present invention further includes a bulk head 8 for closing the front end of the side sill 1, 2 and the bulk head 8 has the same cross-section as the outline defined by the side sill 1, 2 and may be fitted on an inner side or an outer side of the front end of the side sill 1, 2. They may be combined by spot welding.

Figure 1B:
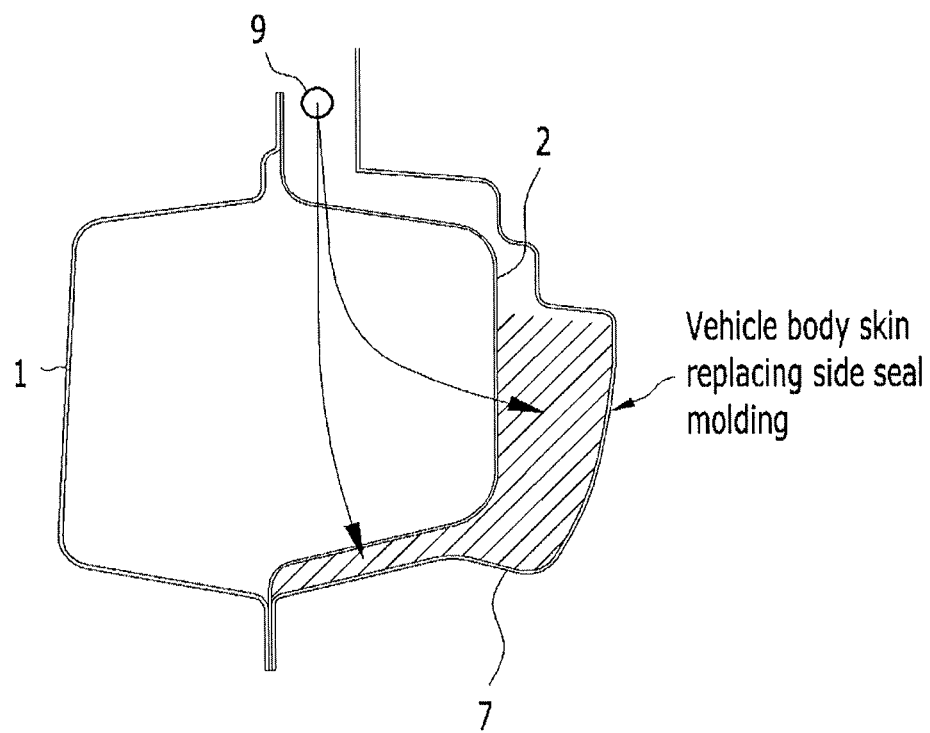

When the bulk head 8 is fitted on the inner side of the front end of the side sill 1, 2, an electrodeposition hole 9a may be formed at the bulk head 8. Accordingly, electrodeposition liquid can flow smoothly into the side sill 1, 2. This is because there is no obstacle interfering with the flow in the longitudinal direction of the vehicle body. Electrodeposition liquid may be supplied to the space inside the side outer panel 7 through holes formed through the side of the outer side sill 2. Since the electrodeposition hole 9a is formed lower than that shown in FIGS. 1A and 1B, anti-corrosion performance is improved, and particularly, the chronic corrosion problem at the space inside the side outer panel 7 can be removed. A wax hole 9b is formed at the right side from the electrodeposition hole 9a, according to an exemplary embodiment of the present invention. The wax hole 9b is an example that the electrodeposition hole can be more freely formed, which is not associated with the anti-corrosion performance.

FIG. 3B shows an exemplary embodiment that the bulk head 8 is matched and fitted on the inner sides of the front ends of the inner side sill 1 and the outer side sill 2. The electrodeposition hole 9a and the wax hole 9b are formed at the bulk head 8.

The front pillar 5 includes a front pillar reinforcing member 5a. The front pillar reinforcing member 5a according to an exemplary embodiment of the present invention may make contact with and be combined with the front pillar 5, the side outer panel 7, and the outer side sill 2. They may be combined by spot welding. By the combining of the front pillar reinforcing member 5a, an opened portion of the side outer panel 7, the opened portion being formed at an upper portion of the bulk head 8, is closed, as shown in FIGS. 3A and 3B.

With reference to FIG. 3B, a front opening 7a of the side outer panel 7 may be formed to make contact with and be fitted on an outer side of the outer side sill 2. An additional opening 7b that can make contact with and be fitted on an outer side of the front pillar reinforcing member 5a may be additionally formed at an upper portion of the front opening 7a. Accordingly, the front opening 7a and the additional opening 7b are opened, such that the formability of the side outer panel 7 increases in comparison to a closed round shape. They may be combined by spot welding.

Since the inner side sill 1 and the outer side sill 2 are integrally formed respectively, the number of parts reduces in comparison to the related art. According to an exemplary embodiment of the present invention, it may be possible to further reduce the number of parts. It may be achieved by forming the front pillar reinforcing member 5a integrally with the front pillar 5 or the side outer panel 7, in forming of the front pillar 5 or the side outer panel 7. The front pillar reinforcing member 5a may be integrally formed with the front pillar 5 as one part or with the side outer panel 7 as one part.

The order of assembling the side bottom structure of a vehicle body according to an exemplary embodiment of the present invention is described hereafter.

The inner side sill 1 and the outer side sill 2 may be combined by spot welding, with the top and bottom flanges 1c and 2c overlapped in the width direction of the vehicle body. The front pillar 5 is attached to the front pillar reinforcing member 5a by spot welding. The front pillar 5 and the front pillar reinforcing member 5a may be attached to the outer side sill 2 of the side sill 1, 2 by sport welding. The side outer panel 7 may be attached by spot welding to make contact with the outer side of the outer side sill 2, the outer side of the front pillar reinforcing member 5a, and the front pillar 5. The bulk head 8 may be finally attached by spot welding to make contact with the inner side of the front end of the side sill 1, 2, or may be attached first right after the side sill 1, 2 is assembled.

Further, the front pillar reinforcing member 5a may be formed integrally with the side outer panel 7, and accordingly, it may be attached to the corresponding portion of the front pillar 5 when the side outer panel 7 is assembled with the side sill 1, 2 and the front pillar 5.

Figure 4A:
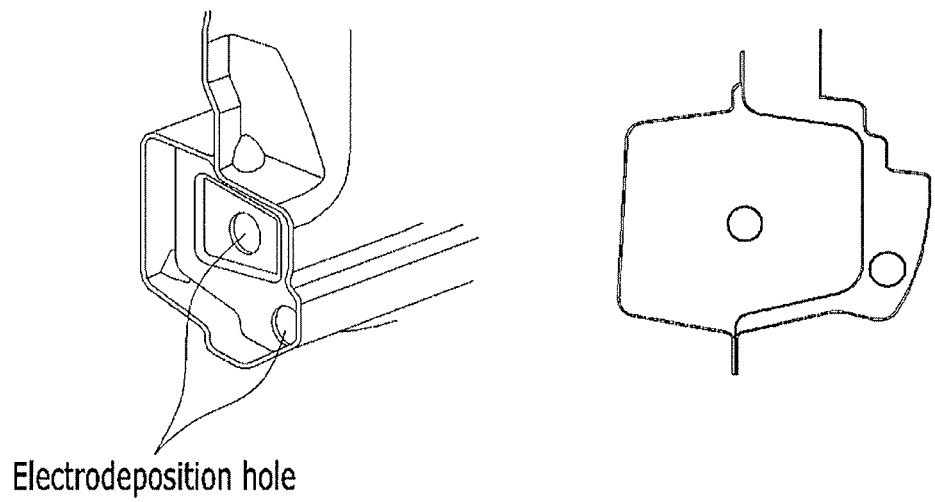
FIGS. 4A and 4B are views showing the effect of the side bottom structure of a vehicle according to an exemplary embodiment of the present invention.
Figure 4B:
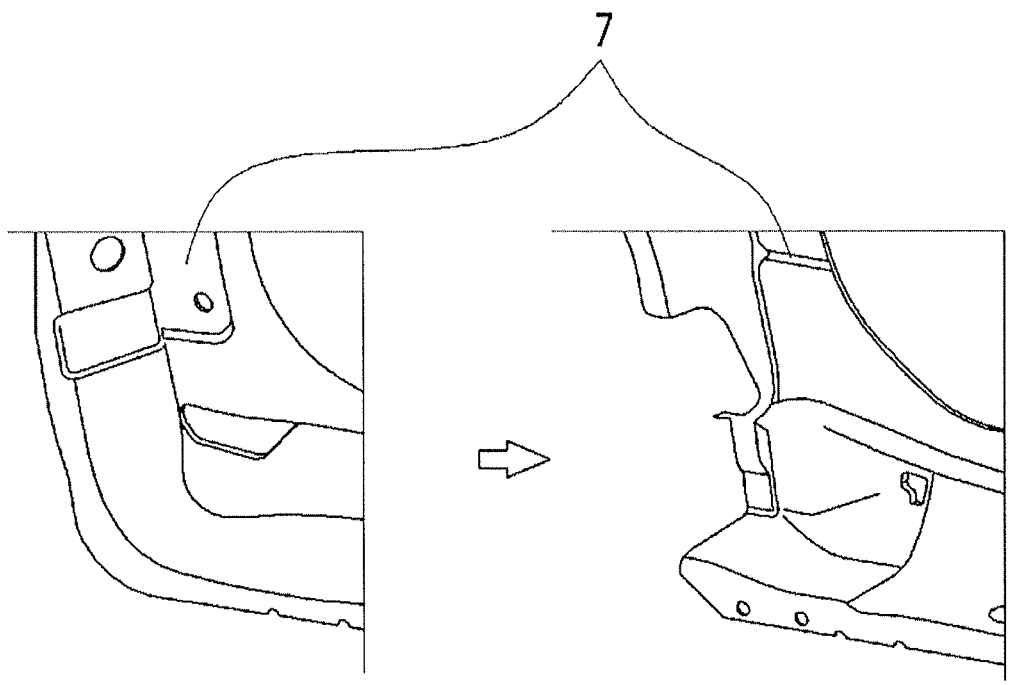

FIGS. 4A and 4B are views showing the effect of the side bottom structure of a vehicle according to an exemplary embodiment of the present invention.

FIG. 4A shows an exemplary embodiment of the configuration of electrodeposition holes of the present invention. It can be seen that since electrodeposition holes are formed at the front of internal spaces such that electrodeposition liquid can flow longitudinally into the internal space of the side sill 1, 2 and the internal space of the side outer panel 7, the anti-corrosion performance can be considerably improved.

FIG. 4B shows an exemplary embodiment of the front of the side outer panel 7 of the present invention. The openings at the front is are shaped to make contact with and be combined with the outer side of the outer side sill 2 and the outer side of the front pillar reinforcing member 5a, respectively. Accordingly, formability of the side outer panel 7 is greatly increased in comparison to the related art at the left side. This is because the round shape of the side outer panel at the left side is removed.

Figure 5:
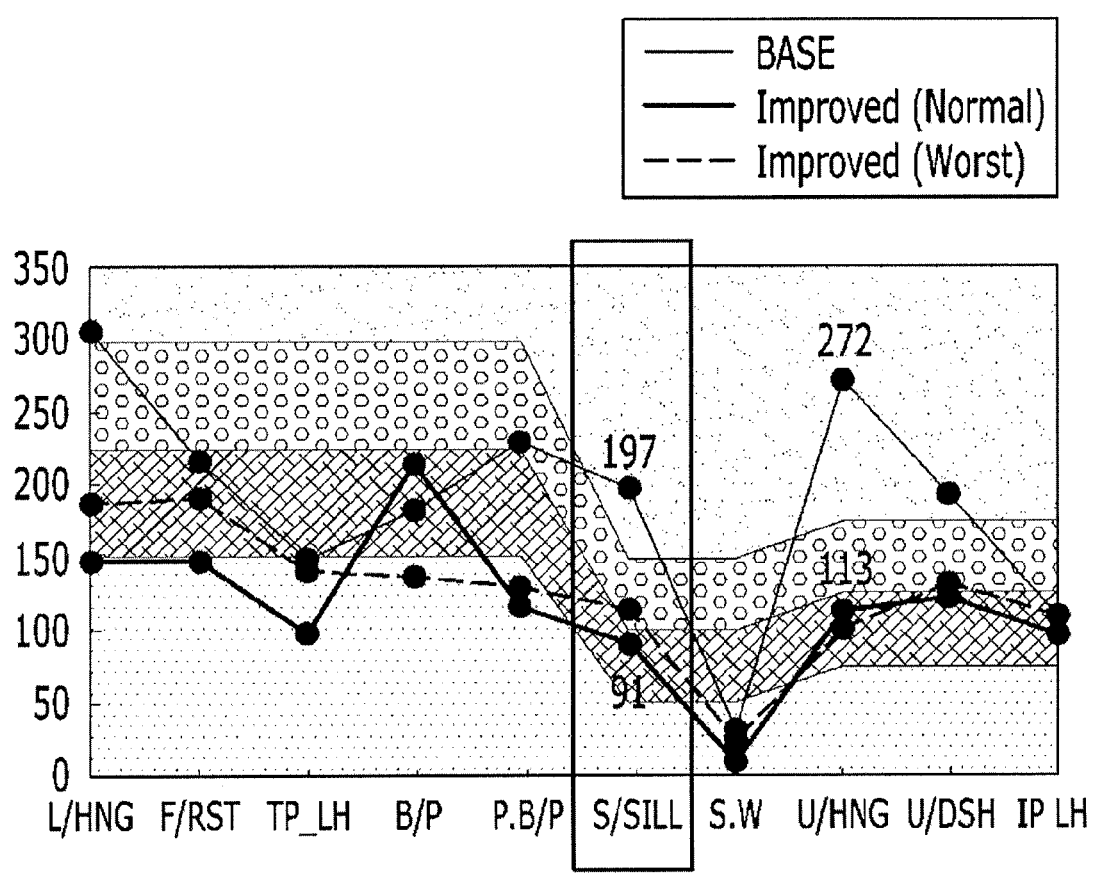
FIG. 5 is a view showing an analysis result on collision performance of a side sill of the side bottom structure of a vehicle according to an exemplary embodiment of the present invention.

FIG. 5 is a view showing an analysis result on collision performance of a side sill of the side bottom structure of a vehicle according to an exemplary embodiment of the present invention.

FIG. 5 shows that the amount of deformation of the side sill was improved to an available level from a dangerous level.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side bottom structure of a vehicle, comprising:
   a side sill having a closed cross-section with a predetermined outline, forming a side bottom of the vehicle body, and elongated in a longitudinal direction of the vehicle;
   a front pillar having one end thereof connected to a front end of the side sill and elongated in a height direction of the vehicle toward a roof of the vehicle; and
   a side outer panel combined with the side sill and the front pillar and forming a side external appearance of the vehicle body,
   wherein the side sill is formed by combining an inner side sill and an outer side sill,
   wherein the inner side sill and the outer side sill have constant transverse cross-sections respectively, and a front end of the inner side sill and a front end of the outer side sill protrude further than the front of the front pillar,
   wherein the front pillar further includes a front pillar reinforcing member, and
   wherein the front pillar reinforcing member makes contact with and is combined with the front pillar, the side outer panel, and the outer side sill.

2. The side bottom structure of claim 1, further comprising a bulk head for closing the front end of the side sill,
   wherein the bulk head has a same cross-section as the predetermined outline and is fitted on an inner side or an outer side of the front end of the side sill, and
   wherein one or more electrodeposition holes are formed in the bulk head.

3. The side bottom structure of claim 1, wherein the front pillar reinforcing member is integrally formed with the side outer panel when the side outer panel is formed, and is combined with the front pillar and the outer side sill integrally with the side outer panel.

4. The side bottom structure of claim 1, wherein the front pillar reinforcing member is integrally formed with the side outer panel when the side outer panel is formed, and is combined with the front pillar and the outer side sill monolithically with the side outer panel.

5. The side bottom structure of claim 2, wherein the front pillar reinforcing member is integrally formed with the side outer panel when the side outer panel is formed, and is combined with the front pillar and the outer side sill integrally with the side outer panel.

6. The side bottom structure of claim 1, wherein a front opening of the side outer panel is formed to make contact with an outer side of the outer side sill.

7. The side bottom structure of claim 6, wherein an additional opening that makes contact with and is fitted on an outer side of the front pillar reinforcing member is additionally formed above the front opening of the side outer panel.

8. The side bottom structure of claim 2, wherein a front opening of the side outer panel is formed to make contact with an outer side of the outer side sill.

9. The side bottom structure of claim 8, wherein an additional opening that makes contact with and is fitted on an outer side of the front pillar reinforcing member is additionally formed above the front opening of the side outer panel.

10. The side bottom structure of claim 1, wherein a side bottom structure of a vehicle body is not equipped with a side sill molding.

11. The side bottom structure of claim 2, wherein a side bottom structure of a vehicle body is not equipped with a side sill molding.

* * * * *